United States Patent
Oyama

(10) Patent No.: US 12,190,603 B2
(45) Date of Patent: Jan. 7, 2025

(54) VEHICLE TRAVELING CONTROL APPARATUS

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 291 days.

(21) Appl. No.: 17/702,451

(22) Filed: Mar. 23, 2022

(65) Prior Publication Data

US 2022/0319190 A1 Oct. 6, 2022

(30) Foreign Application Priority Data

Mar. 31, 2021 (JP) .................................. 2021-061130

(51) Int. Cl.
*G06V 20/58* (2022.01)
(52) U.S. Cl.
CPC ........ *G06V 20/58* (2022.01); *B60W 2420/403* (2013.01); *B60W 2420/408* (2024.01)
(58) Field of Classification Search
CPC ............ G06V 20/58; B60W 2420/403; B60W 2420/408
See application file for complete search history.

(56) References Cited

U.S. PATENT DOCUMENTS

2014/0225990 A1* 8/2014 Einecke ............... H04N 13/128
382/104
2020/0158869 A1* 5/2020 Amirloo Abolfathi ......................
G06T 7/521
2022/0113419 A1* 4/2022 Sharma ................ G01S 17/931

FOREIGN PATENT DOCUMENTS

| JP | 2004-028727 A | 1/2004 |
|---|---|---|
| JP | 2017-032356 A | 2/2017 |
| JP | 2020-204583 A | 12/2020 |
| WO | 2019-093136 A1 | 5/2019 |

OTHER PUBLICATIONS

Office Action dated Nov. 19, 2024, from corresponding Japanese Patent Application No. 2021-061130, 5 pages.

* cited by examiner

*Primary Examiner* — Casey L Kretzer
(74) *Attorney, Agent, or Firm* — Rimon P.C.

(57) ABSTRACT

A vehicle traveling control apparatus includes a stereo camera device, a LiDAR device, and a control unit. The stereo camera device recognizes a predetermined range of a front region of the vehicle as an image to acquire image data, and acquires three-dimensional image information including distance information on the basis of the acquired image data. The LiDAR device acquires three-dimensional point cloud data including distance information for each of detection points, by scanning substantially a same range as a range recognized by the stereo camera device, of the front region of the vehicle. The control unit controls the stereo camera device and the LiDAR device. The control unit includes a camera calibration unit that performs calibration of the stereo camera device, by correcting a position shift of the three-dimensional image information acquired by the stereo camera device, with respect to the three-dimensional point cloud data acquired by the LiDAR device.

7 Claims, 6 Drawing Sheets

VEHICLE TRAVELING CONTROL APPARATUS

CROSS-REFERENCE TO RELATED APPLICATIONS

The present application claims priority from Japanese Patent Application No. 2021-061130 filed on Mar. 31, 2021, the entire contents of which are hereby incorporated by reference.

BACKGROUND

The technology relates to a vehicle traveling control apparatus that controls traveling of a vehicle.

For vehicles such as automobiles, an automatic driving control technique of causing a vehicle to travel automatically without requiring a driving operation of a driver who drives the vehicle has been recently developed. In addition, various vehicle traveling control apparatuses configured to assist the driver's driving operation have been proposed and put into practical use. The vehicle traveling control apparatus uses the automatic driving control technique to reduce the burden of the driver's driving operation, and to improve safety in causing the vehicle to travel.

For example, some vehicle traveling control apparatuses include a surrounding environment recognition device that uses various sensors (e.g., autonomous sensor devices), including an imaging device (e.g., a camera), a radar device, and a sonar device. The surrounding environment recognition device recognizes an obstacle present in a region (e.g., mainly a front region) in a traveling direction of a vehicle or a rear region or side regions of the vehicle. Examples of the obstacle include another vehicle, a mobile body such as a pedestrian, a bicycle, or a two-wheeled vehicle, and a fixed object. On the basis of a recognition result obtained by the surrounding environment recognition device, the vehicle traveling control apparatus achieves various traveling controls for avoidance of collision or contact of the vehicle with the recognized obstacle. Examples of the various traveling controls include an emergency braking control, e.g., an autonomous emergency braking (AEB) control, a steering control, and a rear and side alert assistance control during a lane change.

Such a vehicle traveling control apparatus uses a stereo camera device as an example of a surrounding environment recognition device configured to recognize a surrounding environment.

In a vehicle traveling control apparatus using a stereo camera device, for example, a mechanical factor can cause an image formation position to be shifted, which can cause distortion in an optical image. Examples of the mechanical factor include: a mounting position shift attributed to accuracy of mounting of the stereo camera device on a vehicle or aged deterioration; and a mounting position shift of an internal constituent member attributed to assembly accuracy in manufacture or aged deterioration of the stereo camera device itself. Examples of the internal constituent member include an image sensor and an imaging lens. Furthermore, distortion of the optical image can be caused by occurrence of an image formation position shift attributed to optical performance, for example, of the imaging lens or imaging through a windshield of the vehicle. Occurrence of such image distortion raises a concern that it becomes difficult to acquire accurate information on a distance to an object. This can cause a malfunction in a vehicle traveling control that is performed by using image information including the distance information, for example, acquired by the stereo camera device.

Hence, for a vehicle traveling control apparatus with a configuration using a stereo camera device, various techniques of suppressing erroneous detection of information on a distance to an object and correcting a detection value have been disclosed. The erroneous detection is caused by, for example, an image formation position shift due to a mechanical position shift, an image formation position shift due to optical performance of an imaging lens, and image distortion described above. For example, reference is made to Japanese Unexamined Patent Application Publication (JP-A) No. 2017-32356.

The technique disclosed in JP-A No. 2017-32356 involves an image processing device that calculates information on a distance to an object on the basis of parallax for the same object in a pair of pieces of image information acquired by a stereo camera device, and a map information acquiring unit that acquires map information. The technique compares a first distance between two stationary objects calculated on the basis of the image information and a second distance between the two stationary objects calculated on the basis of the map information, and corrects the parallax with respect to the second distance, to make the first and second distances match each other.

SUMMARY

An aspect of the technology provides a vehicle traveling control apparatus to be applied to a vehicle. The vehicle traveling control apparatus includes a stereo camera device, a light detection and ranging device, and a control unit. The stereo camera device is configured to recognize a predetermined range of a front region of the vehicle as an image to acquire image data, and to acquire three-dimensional image information including distance information on the basis of the acquired image data. The light detection and ranging device is configured to acquire three-dimensional point cloud data including distance information for each of detection points, by scanning substantially a same range as a range recognized by the stereo camera device, of the front region of the vehicle. The control unit is configured to control the stereo camera device and the light detection and ranging device. The control unit includes a camera calibration unit configured to perform calibration of the stereo camera device, by correcting a position shift of the three-dimensional image information acquired by the stereo camera device, with respect to the three-dimensional point cloud data acquired by the light detection and ranging device.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
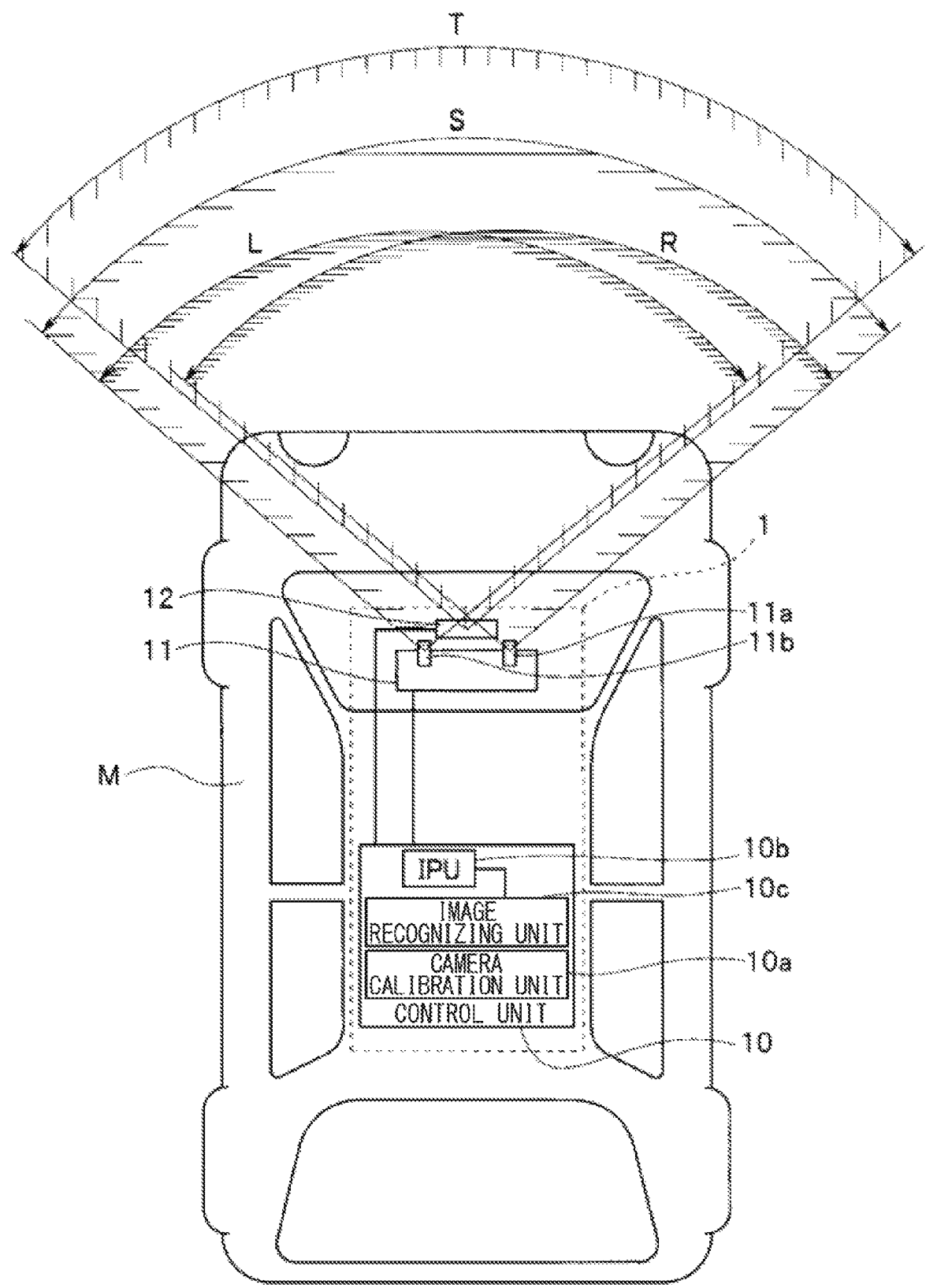
FIG. 1 is a block diagram illustrating an outline configuration of a vehicle traveling control apparatus according to one example embodiment of the technology.

The technique disclosed in JP-A No. 2017-32356 uses map information, and therefore involves an acquiring unit that acquires the map information. In addition, information processing is complicated by including, for example, a calculation process based on image information, a calculation process based on map information, and a comparison process of comparing results of the calculation processes. This raises a concern that a significant load is put on the information processing.

It is desirable to provide a vehicle traveling control apparatus that makes it possible to perform calibration of a stereo camera device more reliably with a simple configuration.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference numerals to avoid redundant description.

A traveling control apparatus according to an example embodiment of the technology may be mounted on a vehicle such as an automobile, and may execute a traveling control for assistance with a driving operation performed by a driver who drives the vehicle.

In general, for a vehicle traveling control apparatus to achieve an advanced automatic driving control of level 3 or more, for example, it may be necessary to consider a case of failure of a device, and to ensure higher safety and reliability. It may accordingly be necessary to configure an autonomous sensor device as a duplexed system, for example, thereby suppressing occurrence of erroneous detection or a malfunction. The autonomous sensor device serves as a surrounding environment recognition device configured to more reliably detect a surrounding environment of a vehicle and constantly acquire accurate surrounding environment information.

As an example of such a surrounding environment recognition device (e.g., an autonomous sensor device) with a duplexed system, a stereo camera device serving as a passive sensor device may be used. The stereo camera device recognizes an object within a predetermined range in a front region of a vehicle as a three-dimensional image, and acquires three-dimensional image information, or three-dimensional point cloud data, including information on a distance to the object within the predetermined range.

As another example of the surrounding environment recognition device (e.g., an autonomous sensor device), a light detection and ranging (LiDAR) device, which is a type of laser sensor device, has recently come to be used.

The LiDAR device is a next-generation laser sensor device that acquires three-dimensional point cloud data including high-accuracy distance information in the following manner. The LiDAR device scans a front predetermined range by applying a laser pulse, for example, and receives a return pulse reflected by and returning from a front object within the predetermined range, thereby acquiring the detailed three-dimensional point cloud data corresponding to the front object included in the predetermined range of the front region. Thus being an active sensor device, the LiDAR device may serve as a substitute for a passive sensor device, such as a stereo camera device.

For example, the stereo camera device serving as a passive sensor device tend to be unable to acquire clear image information in a dark place, resulting in a decrease in distance measuring accuracy. In contrast, the LiDAR device serving as an active sensor device is able to constantly perform accurate distance measuring, without a decrease in the distance measuring accuracy, even in a dark place, for example. Hence, to achieve a high-level automatic driving control, the LiDAR device, i.e., the active sensor device, is mainly used for detection in a case of a surrounding environment such as a dark place. Thus, a surrounding environment recognition device with a duplexed system is configured to recognize a front region by two sensor devices (e.g., the stereo camera device and the LiDAR device) configured to acquire three-dimensional point cloud data.

In the vehicle traveling control apparatus according to the example embodiment, a surrounding environment recognition device that acquires three-dimensional point cloud data including distance information may be configured as a duplexed system, as a configuration for achievement of a more advanced automatic driving control. As units of the duplexed system, the configuration may include, in combination, a stereo camera device serving as a passive sensor device and a LiDAR device serving as an active sensor device, for example.

In other words, the traveling control apparatus according to the example embodiment may use various sensors, including a stereo camera device and a LiDAR device, for example, to acquire information regarding a surrounding environment of the vehicle. In this case, these various sensors may be configured as autonomous sensor devices that each operate autonomously. The stereo camera device and the LiDAR device are set to recognize substantially the same range in a front region of the vehicle, to configure the surrounding environment recognition device with a duplexed system.

The information regarding the surrounding environment of the vehicle may refer to information on various objects, for example, present around the vehicle. Examples of such various objects may include: another vehicle, such as a preceding vehicle, a subsequent vehicle, an oncoming vehicle, or a side-by-side vehicle, traveling around the vehicle; a mobile body, such as a pedestrian or a bicycle; and a fixed object, such as a building or various constructions. Hereinafter, the information regarding the surrounding environment of the vehicle may be referred to as surrounding environment information, for example.

The traveling control apparatus according to the example embodiment may appropriately use the surrounding environment information acquired by using the various sensors, including the stereo camera device and the LiDAR device, to perform a traveling control that assists the driving operation of the driver of the vehicle.

In a vehicle traveling control apparatus that uses a stereo camera device, accuracy of mounting of the stereo camera device on a vehicle or aged deterioration, for example, can cause a mounting position of the stereo camera device to be shifted from a normal position. Also for the stereo camera device itself, assembly accuracy in manufacture or aged deterioration can cause a mounting position of an image sensor or an imaging lens, for example, fixed inside the device to be shifted from a normal position. If a mechanical position shift thus occurs in the stereo camera device, causing an image formation position of an optical image to be shifted, distortion occurs in the optical image. This is an example of a mechanical image formation position shift.

In addition to the image formation position shift due to these mechanical factors, optical performance, for example, of the imaging lens causes the image formation position of the optical image to be shifted in the stereo camera device, which can cause distortion in the optical image. This is an example of an optical image formation position shift. It has been known that the distortion of the optical image in this case tends to appear more significantly as an angle of view of the imaging lens is widened, and to appear significantly in a peripheral portion of the image, for example.

In addition, a stereo camera device that is applied to a vehicle traveling control apparatus is generally mounted on and fixed to a fixed portion inside a vehicle compartment of a vehicle in a normal case. In this case, the stereo camera device is configured to acquire image information of a front region, for example, through a windshield of the vehicle.

In general, a windshield used for a vehicle is not uniform flat glass, but has a complicated shape with different curvatures in different portions. The windshield also sometimes has glass strains in some portions for a manufacture reason. Therefore, when a light ray from a front object passes through the windshield, different refractions occur in different portions, which can cause an image formation position of an optical image on an imaging plane to be shifted from a normal position. This shift can cause distortion in the optical image. This is an example of the optical image formation position shift.

Thus, in a case where the vehicle traveling control apparatus has a configuration using the stereo camera device as a surrounding environment recognition device, image distortion in an optical image of an object can be caused by, for example, the image formation position shift due to the mechanical factor, the image formation position shift caused by the optical performance of the imaging lens, and the image formation position shift caused by the windshield. This results in a decrease in accuracy of information on a distance to the object acquired on the basis of the optical image.

In addition, it may be desired for the stereo camera device that is applied to the vehicle traveling control apparatus to acquire image information of a wide range of the front region of the vehicle. The imaging lens used for the stereo camera device accordingly tends to have a widened angle of view.

However, widening an angle of view of an imaging lens of a stereo camera device generally tends to cause distortion of an optical image significantly in a peripheral region, for example, of an image region acquired by the imaging lens. Such distortion of the optical image can cause a decrease in distance measuring accuracy.

If distortion of the optical image is caused by the various factors, the distance measuring accuracy decreases in the stereo camera device, as described above. This can cause a malfunction in a vehicle traveling control that is executed by using the image information including the distance information, for example, acquired by the stereo camera device.

Such distortion of the optical image is correctable by performing predetermined signal processing on image data. However, executing such a correction process each time causes a significant load to be put on a processing circuit, for example.

In a case where the angle of view of the imaging lens of the stereo camera device is widened, resolution of a distant object tends to decrease, resulting in a blurred image. Consequently, in a camera unit that uses the imaging lens with the widened angle of view, it may be necessary to increase the number of pixels of an image sensor to form an image of a distant object more clearly. The increase in the number of pixels of the image sensor tends to cause an increase in an image data amount.

Thus, if the angle of view of the imaging lens is widened in the stereo camera device, a load of signal processing related to the distortion correction of the optical image tends to increase. In addition, a load of data processing tends to increase as a result of the increase in the amount of image data to be treated.

On the other hand, the LiDAR device has a limit to the extent of high-speed scanning, because of its structural characteristic of performing scanning within a predetermined range by mechanical driving while applying a laser pulse. A typical LiDAR device generally has a sampling rate of about 100 milliseconds (10 Hz).

In contrast, generally used stereo camera devices have performance that easily enables high-speed image capturing of about 120 frames per second (fps), even with an image sensor including a large number of pixels (e.g., about over two million pixels).

In consideration of such circumstances, it may be desired that the stereo camera device be used as a sensor device configured to constantly calculate a distance to an object at high speed, to respond quickly to a suddenly arising environment situation, such as a pedestrian's running-out or another vehicle's cutting-in. Accordingly, it may be desired that the stereo camera device constantly keep serving as a high-speed and high-accuracy distance measuring sensor device.

To suppress signal processing that can cause overloads, for example, to the extent possible, the traveling control apparatus according to the example embodiment may be configured to automatically perform a calibration process of the stereo camera device, with respect to the three-dimensional point cloud data including the distance information acquired by the LiDAR device, i.e., the laser sensor device, when a load on the traveling control apparatus is light, the vehicle is in a stable state, and a change in the surrounding environment is small.

A description is given of an outline configuration of a traveling control apparatus according to an example embodiment of the technology, with reference to FIG. 1. FIG. 1 is a block diagram illustrating an outline configuration of the traveling control apparatus (also referred to as a vehicle traveling control apparatus) according to the example embodiment of the technology.

A traveling control apparatus 1 according to the example embodiment may be mounted on a vehicle M (hereinafter, also referred to as an own vehicle), such as an automobile. The traveling control apparatus 1 may have, for example, a configuration substantially similar to that of an existing same type of traveling control apparatus. Accordingly, FIG. 1 illustrates only elements directly related to any embodiment of the technology, out of elements of the traveling control apparatus 1 according to the example embodiment, and omits elements not directly related to any embodiment of the technology. In the following description, assuming that elements other than the elements directly related to any embodiment of the technology are substantially similar to those of the existing traveling control apparatus, detailed description thereof is omitted, and only the elements directly related to any embodiment of the technology are described in detail.

As illustrated in FIG. 1, the traveling control apparatus 1 according to the example embodiment may include at least a stereo camera device 11, a LiDAR device 12, and a control unit 10, for example. The stereo camera device 11 and the LiDAR device 12 may serve as autonomous sensor devices provided to recognize the surrounding environment of the vehicle M. The control unit 10 may comprehensively control the whole of the traveling control apparatus 1.

The various sensors (e.g., autonomous sensor devices) to be used to recognize the surrounding environment of the vehicle M may include the stereo camera device 11 and the LiDAR device 12 described above and unillustrated sensors. Examples of the unillustrated sensors may include: a longitudinal acceleration sensor that detects a longitudinal acceleration of the own vehicle; a wheel speed sensor that detects a speed of rotation of each of a front-right wheel, a front-left wheel, a rear-right wheel, and a rear-left wheel; a gyro sensor that detects an angular velocity or angular acceleration of the own vehicle; and a global navigation satellite system (GNSS) receiver that receives positioning signals from a plurality of positioning satellites. These various sensors may be coupled to the control unit 10, for example. The control unit 10 may receive outputs from these various sensors, and execute a predetermined traveling control via an unillustrated predetermined unit as appropriate.

The control unit 10 may include: a known microcomputer including, without limitation, a central processing unit (CPU), a random-access memory (RAM), a read-only memory (ROM), and a non-volatile storage; and a peripheral device thereof. The ROM may contain, for example, a program to be executed by the CPU and fixed data, such as a data table, stored in advance.

The stereo camera device 11 may be a passive sensor device that recognizes a predetermined range in a front region of the vehicle M as a three-dimensional image, and acquires three-dimensional image information including distance information of an object included in the three-dimensional image. The stereo camera device 11 may be coupled to the control unit 10. Thus, the stereo camera device 11 may be driven and controlled by the control unit 10, and may output acquired data of a predetermined form to the control unit 10.

The stereo camera device 11 may include a camera unit, for example, including a pair of left and right cameras of a main camera 11a and a sub-camera 11b fixed to the upper middle of a front part in a vehicle compartment of the vehicle M.

The main camera 11a and the sub-camera 11b included in the stereo camera device 11 may be, for example, autonomous sensor devices that sense a real space ahead of the vehicle M, and acquire image information mainly on a surrounding traveling environment ahead of the vehicle. The two cameras (i.e., the main camera 11a and the sub-camera 11b) may accordingly include respective imaging lenses (see reference numerals 101a and 101b in FIG. 2) and respective image sensors (see reference numerals 102a and 102b in FIG. 2).

The cameras (i.e., the main camera 11a and the sub-camera 11b) themselves may have a typical configuration in which the respective imaging lenses (101a and 101b) form optical images of an object, forming the optical images on imaging planes of the respective image sensors (102a and 102b), and the image sensors (102a and 102b) perform a predetermined photoelectric conversion process, for example, thereby acquiring a pair of image data corresponding to the object. Thus, a detailed configuration and detailed description of the cameras (i.e., the main camera 11a and the sub-camera 11b) are omitted.

The main camera 11a and the sub-camera 11b included in the stereo camera device 11 may be disposed, for example, at symmetrical positions with respect to a midpoint in a vehicle-width direction. The stereo camera device 11 may thus acquire a pair of left and right image data obtained by imaging, from different viewpoints, a predetermined region ahead of the vehicle M by the two cameras (i.e., the main camera 11a and the sub-camera 11b). The pair of image data may be transmitted to an image processing unit (IPU) 10b provided in the control unit 10.

A reference numeral R illustrated in FIG. 1 conceptually denotes an imaging range in a horizontal direction of the main camera 11a serving as the right camera unit of the stereo camera device 11. A reference numeral L illustrated in FIG. 1 conceptually denotes an imaging range in the horizontal direction of the sub-camera 11b serving as the left camera unit of the stereo camera device 11. A reference numeral S illustrated in FIG. 1 conceptually denotes an imaging range in the horizontal direction covered by the pair of left and right cameras (i.e., the main camera 11a and the sub-camera 11b) of the stereo camera device 11.

The IPU 10b may include a processing circuit, for example, that receives the pair of left and right image data acquired by the two cameras (i.e., the main camera 11a and the sub-camera 11b), and performs predetermined image data processing on the basis of the pair of image data. The IPU 10b may, for example, generate stereo image information (i.e., three-dimensional image information), on the basis of the pair of left and right image data acquired by the two cameras (i.e., the main camera 11a and the sub-camera 11b). For the same object imaged in each of the pair of left and right image data, the IPU 10b may acquire a position shift amount caused between two images (i.e., parallax information). The IPU 10b may generate, on the basis of the parallax information, three-dimensional image information (i.e., three-dimensional (3D) point cloud data), for example, including information on a distance from the stereo camera device 11 to the object. The three-dimensional image information thus generated may be transmitted to an image recognizing unit 10c serving as an image recognition device provided in the control unit 10.

The image recognizing unit 10c may receive the three-dimensional image information transmitted from the IPU 10b, and recognize, for example, a situation of a surface of a road on which the vehicle M travels (hereinafter, referred to as a road surface situation), on the basis of the three-dimensional image information. The image recognizing unit 10c may recognize lane lines that define left and right of a traveling lane of the road on which the vehicle M travels, and determine various pieces of information, including a road curvature [1/m] of each of the left and right lane lines and a width (i.e., a lane width) between the left and right lane lines.

The road curvature and the lane width may be determined by any of various known methods. For example, on the basis of the image information, the left and right lane lines may be recognized by performing a binarization process that utilizes a difference in luminance. The curvature of each of the left and right lane lines may be determined for each predetermined section through, for example, a curve-approximating expression that is based on a least-square method.

The image recognizing unit 10c may also perform predetermined pattern matching, for example, on the basis of the three-dimensional image information, to recognize a three-dimensional object. Examples of the three-dimensional object may include a guard rail and a curbstone that extend along the road, and a pedestrian, a two-wheeled vehicle, and another vehicle other than a two-wheeled vehicle that are present in the front region on the road on which the vehicle M travels. In one example, the image recognizing unit 10c may recognize, for example, various pieces of information, including a type of the three-dimensional object, a distance to the three-dimensional object, a movement speed of the three-dimensional object, and a relative speed between the three-dimensional object and the vehicle M.

Figure 2:
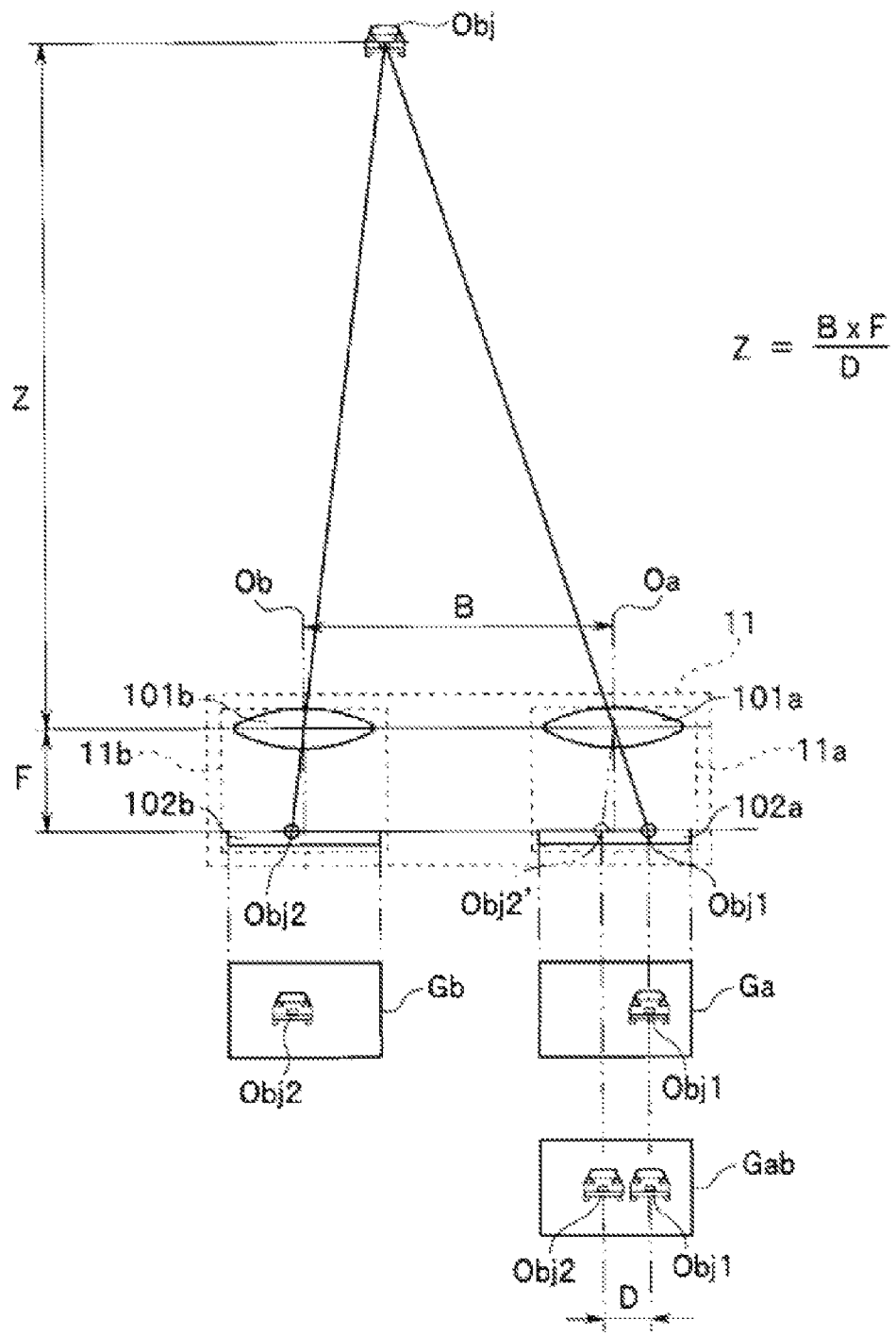
FIG. 2 is a conceptual diagram illustrating a distance measuring principle of calculating a distance to an object on the basis of parallax information by a stereo camera device included in the traveling control apparatus illustrated in FIG. 1.

A description is given of a distance measuring principle on which the stereo camera device 11 of the traveling control apparatus 1 according to the example embodiment calculates a distance to a front object on the basis of the parallax information, with reference to FIG. 2. FIG. 2 is a conceptual diagram illustrating the distance measuring principle of calculating the distance to the object on the basis of the parallax information by the stereo camera device included in the traveling control apparatus according to the example embodiment.

As illustrated in FIG. 2, the stereo camera device 11 of the traveling control apparatus 1 according to the example embodiment may include the pair of left and right cameras (i.e., the main camera 11a and the sub-camera 11b). The cameras (i.e., the main camera 11a and the sub-camera 11b) may include the respective imaging lenses (101a and 101b) and the respective image sensors (102a and 102b).

In this case, the cameras (i.e., the main camera 11a and the sub-camera 11b) included in the stereo camera device 11 may be disposed with a predetermined interval (see a reference numeral B in FIG. 2), in the horizontal direction, between optical axes (Oa and Ob) of the respective imaging lenses (101a and 101b), and the optical axes (Oa and Ob) may be disposed to be substantially parallel to each other. The interval in the horizontal direction (the reference numeral B in FIG. 2) between the optical axes (Oa and Ob) of the two cameras (i.e., the main camera 11a and the sub-camera 11b) may be referred to as a baseline length of the stereo camera device 11.

A focal length of each of the imaging lenses (101a and 101b) is denoted by a reference numeral F in FIG. 2. Each of the image sensors (102a and 102b) may be disposed to have the imaging plane parallel to a plane orthogonal to the optical axis (Oa or Ob), at a position where a distance from the corresponding imaging lens (101a or 101b) matches the focal length F. Each imaging lens (101a or 101b) may be disposed to allow the corresponding optical axis (Oa or Ob) to be positioned at the center of the imaging plane of the corresponding image sensor (102a or 102b).

Ahead of the stereo camera device 11 with such a configuration, an object Obj is assumed to be present at a position separated by a predetermined distance Z. In this case, reflected light from the object Obj may pass through the imaging lenses (101a and 101b), and form images at predetermined positions on the imaging planes of the respective image sensors (102a and 102b) separated from the imaging lenses by the focal length F. Optical images of the object Obj may thus be formed on the imaging planes of the image sensors (102a and 102b).

The example illustrated in FIG. 2 indicates that the optical images of the object Obj are formed at a position denoted by a reference numeral Obj1 on the imaging plane of the image sensor 102a of the main camera 11a, and a position denoted by a reference numeral Obj2 on the imaging plane of the image sensor 102b of the sub-camera 11b.

In this case, if the position of the object image Obj2 formed on the imaging plane of the image sensor 102b of the sub-camera 11b is illustrated on the imaging plane of the image sensor 102a of the main camera 11a, a position denoted by a reference numeral Obj2' may correspond to the position.

A reference numeral Ga in FIG. 2 denotes an example of an image including the object image Obj1 formed on the imaging plane of the image sensor 102a of the main camera 11a. A reference numeral Gb in FIG. 2 denotes an example of an image including the object image Obj2 formed on the imaging plane of the image sensor 102b of the sub-camera 11b.

If the image Gb of the sub-camera 11b is superimposed on the image Ga of the main camera 11a, an image denoted by a reference numeral Gab in FIG. 2 may be obtained. The object image Obj1 of the main camera 11a and the object image Obj2 of the sub-camera 11b may be displayed, in the image Gab, as being separated from each other by a distance D in the horizontal direction. The distance D may serve as parallax between the two cameras (i.e., the main camera 11a and the sub-camera 11b). Note that the parallax between the two cameras (i.e., the main camera 11a and the sub-camera 11b) tends to increase as the distance to the object becomes shorter, and decrease as the distance to the object becomes longer.

In this case, the distance Z from the stereo camera device 11 to the object Obj may be determined by the following expression (1), on the basis of the baseline length B, the focal length F, and the parallax D:

$$Z = B \times F / D \quad (1).$$

The stereo camera device 11 may perform a stereo matching process for the two images (Ga, Gb) acquired by the two cameras (i.e., the main camera 11a and the sub-camera 11b), and estimate the parallax for the same object for each corresponding region. The stereo camera device 11 may generate a parallax image by determining parallax distribution for the whole image.

The stereo camera device 11 may determine the distance information for each pixel by using the above expression (1), on the basis of the parallax image generated in the above manner. This enables the stereo camera device 11 to acquire the three-dimensional point cloud data including the distance information for each pixel.

The LiDAR device 12, which is a type of laser sensor device, may be an active sensor device that acquires three-dimensional point cloud data including high-accuracy information on a distance to an object included in a predetermined range in the front region of the vehicle M. The LiDAR device 12 may be coupled to the control unit 10. Thus, the LiDAR device 12 may be driven and controlled by the control unit 10, and may output acquired data of a predetermined form to the control unit 10.

The LiDAR device 12 may scan the predetermined range (see a reference numeral T in FIG. 1) while applying a laser pulse to the front region of the vehicle M, for example, and receive a return pulse reflected by and returning from a front object, thereby acquiring detailed three-dimensional point cloud data corresponding to the front object within the predetermined range of the front region of the vehicle M. The three-dimensional point cloud data acquired by the LiDAR device 12 may be transmitted to the control unit 10, as described above. Receiving this, the control unit 10 may recognize, as a three-dimensional object, another vehicle and various mobile bodies, including a pedestrian and a bicycle, for example, present ahead of the vehicle M.

Figure 3:
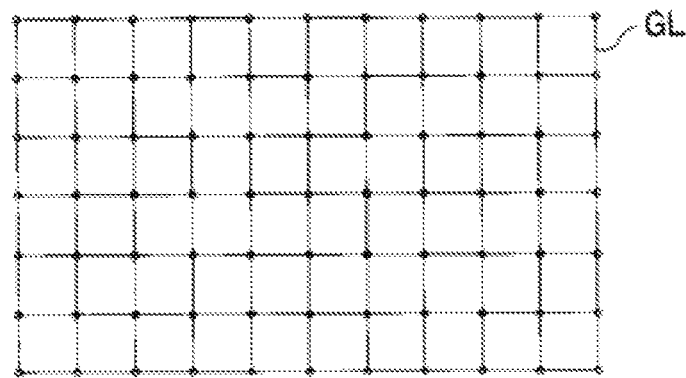
FIG. 3 is a conceptual diagram illustrating point cloud data detected by a LiDAR device included in the traveling control apparatus illustrated in FIG. 1.

FIG. 3 is a conceptual diagram illustrating the point cloud data detected by the LiDAR device included in the traveling control apparatus according to the example embodiment.

The LiDAR device 12 may scan the predetermined range (see the reference numeral T in FIG. 1) of the front region of the vehicle M, for example, as a rectangular point cloud data frame GL illustrated in FIG. 3. In other words, the LiDAR device 12 may scan the predetermined range, or the point cloud data frame GL, by a method such as raster scanning, while applying the laser pulse. The LiDAR device 12 may thus acquire the point cloud data for the three-dimensional object within the predetermined range, or the point cloud data frame GL. The example illustrated in FIG. 3 conceptually represents point cloud data in which intersection points of a grid shape serve as detection points.

In the traveling control apparatus 1 according to the example embodiment, the front recognition range (see the reference numeral S in FIG. 1) covered by the stereo camera device 11 and the front recognition range (see reference numeral T in FIG. 1) covered by the LiDAR device 12 are set to be substantially the same range, as illustrated in FIG. 1.

The stereo camera device 11 and the LiDAR device 12 both acquire three-dimensional point cloud data including information on a distance to a front object, as described above. Thus, in the traveling control apparatus 1 according to the example embodiment, the stereo camera device 11 (i.e., the passive sensor device) and the LiDAR device 12 (i.e., the active sensor device) are combined to configure the surrounding environment recognition device with a duplexed system.

The control unit 10 performs driving controls of the stereo camera device 11 and the LiDAR device 12, for example. The control unit 10 may also receive output data (e.g., the three-dimensional point cloud data) serving as detection results from the devices (the stereo camera device 11 and the LiDAR device 12), and store the output data in an unillustrated predetermined storage memory as appropriate. At the same time, the control unit 10 may perform predetermined signal processing for the various traveling controls, and transmit output data serving as a result of the processing to the unillustrated predetermined unit as appropriate.

The control unit 10 may include a camera calibration unit 10a, the image processing unit (IPU) 10b, and the image recognizing unit 10c, for example (see FIG. 1). The camera calibration unit 10a may include a processing circuit, for example, that performs a calibration process for the output data of the stereo camera device 11. For example, the camera calibration unit 10a may perform a calibration process of making the three-dimensional point cloud data acquired by the stereo camera device 11 match the three-dimensional point cloud data acquired by the LiDAR device 12, with respect to the three-dimensional point cloud data acquired by the LiDAR device 12. The IPU 10b may be an image processing unit including a processing circuit, for example, that receives the pair of left and right image data acquired by the stereo camera device 11 (e.g., the two cameras of the main camera 11a and the sub-camera 11b) and processes the pair of image data as appropriate. The image recognizing unit 10c may include a processing circuit, for example, that receives the processed image data supplied from the IPU 10b and performs a predetermined image recognition process, for example.

As described above, the LiDAR device 12 is able to constantly acquire three-dimensional point cloud data including high-accuracy distance information. In contrast, the mechanical image formation position shift or the optical image formation position shift, for example, described above can cause an error in the distance information acquirable by the stereo camera device 11.

Figure 4:
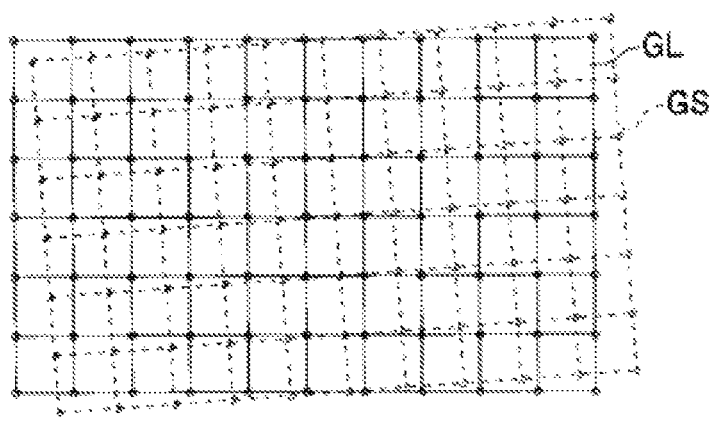
FIG. 4 is a conceptual diagram illustrating a position shift of a point cloud data frame of the stereo camera device with respect to a point cloud data frame of the LiDAR device in a case where a mechanical position shift occurs in the stereo camera device included in the traveling control apparatus illustrated in FIG. 1.
Figure 5:
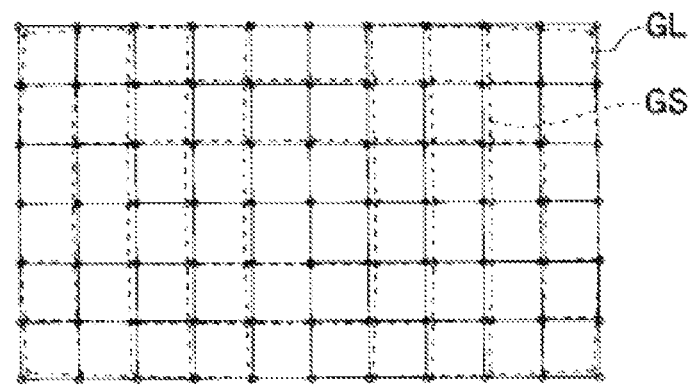
FIG. 5 is a conceptual diagram illustrating a position shift of the point cloud data frame of the stereo camera device with respect to the point cloud data frame of the LiDAR device in a case where an image formation position shift attributed to optical performance of an imaging lens of the stereo camera device included in the traveling control apparatus illustrated in FIG. 1 occurs.
Figure 6:
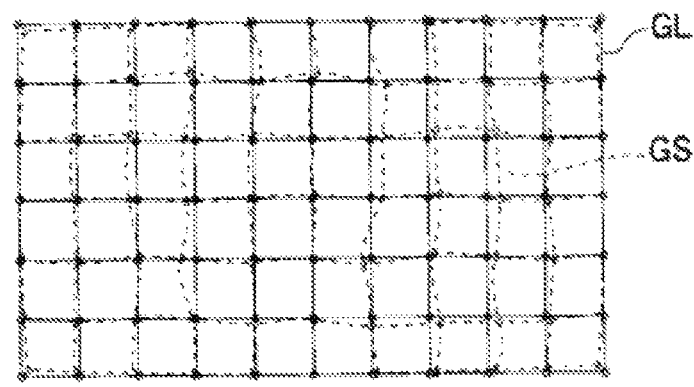
FIG. 6 is a conceptual diagram illustrating a position shift of the point cloud data frame of the stereo camera device with respect to the point cloud data frame of the LiDAR device in a case where an image formation position shift attributed to a windshield occurs in the stereo camera device included in the traveling control apparatus illustrated in FIG. 1.

For example, FIG. 4 to FIG. 6 are diagrams conceptually illustrating the position shift of the point cloud data frame of the stereo camera device with respect to the point cloud data frame of the LiDAR device in a case where the stereo camera device included in the traveling control apparatus according to the example embodiment is influenced by various factors to exhibit the image formation position shift.

In FIG. 4 to FIG. 6, the reference numeral GL denotes the point cloud data frame (i.e., a predetermined scanning range frame) acquired by the LiDAR device 12. In FIG. 4 to FIG. 6, a reference numeral GS indicated by a dotted line denotes the point cloud data frame (i.e., a predetermined image range frame) determined on the basis of the parallax image generated by the stereo camera device 11.

Examples of the mechanical position shift in the stereo camera device 11 may include a position shift of the mounting position attributed to the accuracy of mounting of the stereo camera device 11 on the vehicle M or aged deterioration, for example, and a position shift of the mounting position of a constituent member (e.g., the image sensor or the imaging lens) inside the device attributed to the assembly accuracy in manufacture or aged deterioration of the stereo camera device 11, for example. Such a mechanical position shift in the stereo camera device 11 can cause a translational shift in an up/down/left/right direction and a rotational shift around an optical axis of an image frame.

FIG. 4 conceptually illustrates the position shift of the point cloud data frame GS of the stereo camera device with respect to the point cloud data frame GL of the LiDAR device in a case where the mechanical image formation position shift occurs in the stereo camera device 11. FIG. 4 illustrates, as an example, a state in which the translational shift and the rotational shift of the image frame have occurred at the same time.

An example of the optical image formation position shift in the stereo camera device 11 is an image formation position shift attributed to the optical performance, for example, of the imaging lens. FIG. 5 conceptually illustrates the position shift of the point cloud data frame GS of the stereo camera device with respect to the point cloud data frame GL of the LiDAR device in a case where the imaging lens of the stereo camera device 11 causes the optical image formation position shift. FIG. 5 illustrates so-called barrel distortion as an example.

Another example of the optical image formation position shift in the stereo camera device 11 is an image formation position shift attributed to the influence of a windshield, for example, of the vehicle. FIG. 6 conceptually illustrates the position shift of the point cloud data frame GS of the stereo camera device with respect to the point cloud data frame GL of the LiDAR device in a case where the image formation position shift attributed to the windshield disposed in front of the stereo camera device 11 occurs.

Hence, the camera calibration unit 10a of the control unit 10 included in the traveling control apparatus 1 according to the example embodiment performs the calibration process of the data (e.g., the point cloud data) acquired by the stereo camera device 11, with respect to the data (e.g., the point cloud data) acquired by the LiDAR device 12, as described above. To perform this calibration process, information regarding a positional relationship between the stereo camera device 11 and the LiDAR device 12 in the vehicle may be used. The information regarding the positional relationship between the stereo camera device 11 and the LiDAR device 12 in the vehicle may be information fixed for individual vehicles. The information is assumed to be stored in advance in a predetermined storage (e.g., an unillustrated storage in the control unit 10), for example. The camera calibration unit 10a may read desired information from the storage, for example, and use the information on an as-needed basis.

The camera calibration unit 10a may perform, for each of the detection points of the point cloud data acquired by the LiDAR device 12, a position correction process to make a corresponding point of the point cloud data acquired by the stereo camera device 11 match the detection point.

In this case, the camera calibration unit 10a may acquire a position shift amount between each of the detection points of the point cloud data obtained by the LiDAR device 12 and the corresponding point of the point cloud data obtained by the stereo camera device 11, over the whole range of overlap between the front recognition ranges (see the reference numerals S and T in FIG. 1) of the two devices, i.e., the stereo camera device 11 and the LiDAR device 12. In other words, the camera calibration unit 10a may acquire the position shift amount between each of the detection points in the point cloud data frame GL of the LiDAR device 12, and the corresponding point, in the point cloud data frame GS of the stereo camera device, corresponding to each detection point.

Figure 7:
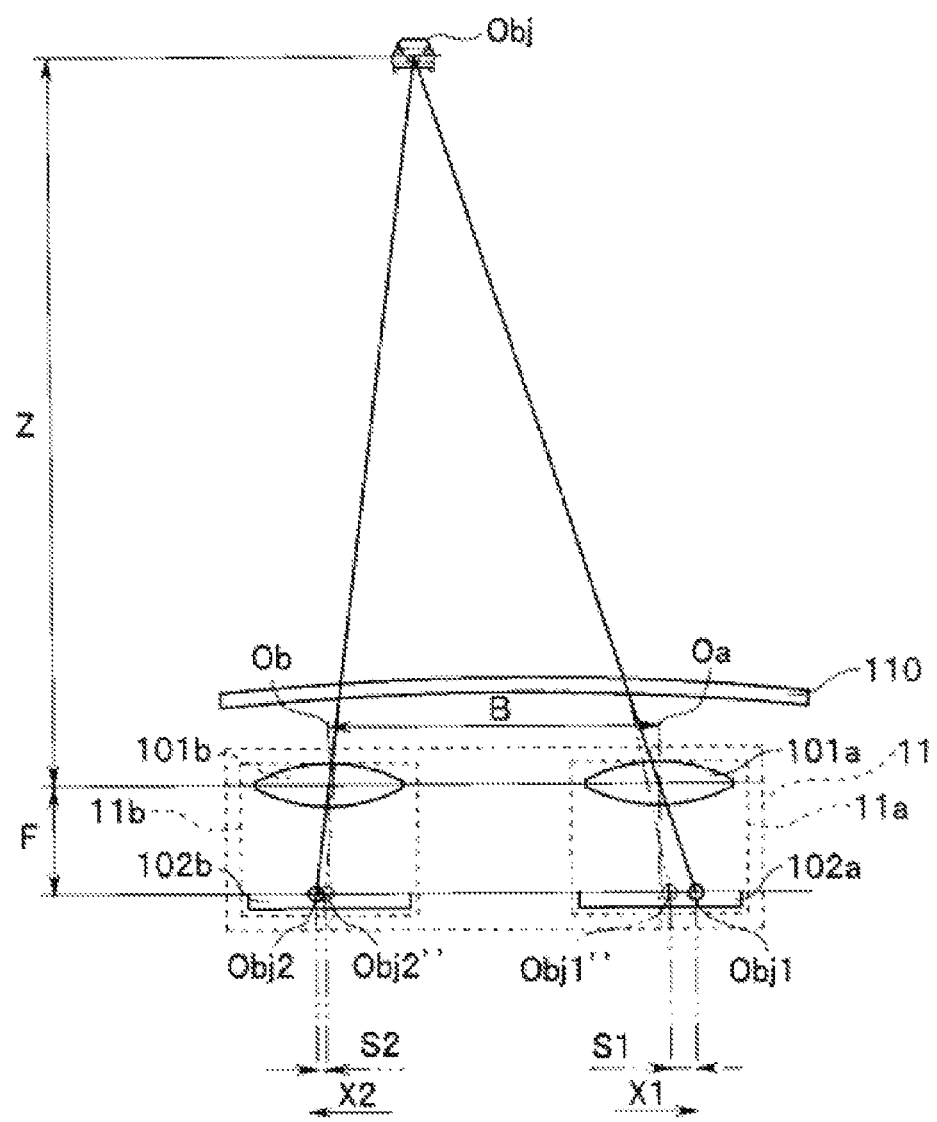
FIG. 7 is a diagram illustrating a concept of position shift correction (i.e., a calibration process) performed in a case where an image formation position shift occurs in the stereo camera device of the traveling control apparatus illustrated in FIG. 1.

FIG. 7 is a diagram illustrating a concept of position shift correction (i.e., a calibration process) performed in a case where an image formation position shift occurs in the stereo camera device 11 of the traveling control apparatus 1 according to the example embodiment. The example illustrated in FIG. 7 indicates that a windshield 110 of the vehicle M is disposed in front of the stereo camera device 11. Note that the configuration other than the windshield 110 illustrated in FIG. 7 may be similar to the configuration of FIG. 2.

The optical images of the object Obj may be formed at a position denoted by a reference numeral Obj1" on the imaging plane of the image sensor 102a of the main camera 11a, and a position denoted by a reference numeral Obj2" on the imaging plane of the image sensor 102b of the sub-camera 11b. The image formation positions Obj1" and Obj2" in this case have been influenced mainly by the windshield 110 (e.g., refraction or reflection applied in passing through glass). In FIG. 7, light rays that have passed through the windshield 110 is indicated by dashed and double-dotted lines.

Assuming image formation positions in a case where the windshield 110 is not present in the configuration of FIG. 7, the optical images of the object Obj are supposed to be formed at the position denoted by the reference numeral Obj1 on the imaging plane of the image sensor 102a of the main camera 11a, and the position denoted by the reference numeral Obj2 on the imaging plane of the image sensor 102b of the sub-camera 11b, as with the case described with reference to FIG. 2. Light rays from the object Obj in this case are indicated by solid lines.

It is possible to estimate that the distance information obtained from the parallax D (see FIG. 2) between the image formation positions Obj1 and Obj2 at which the images are originally supposed to be formed substantially matches the distance information of corresponding detection points, in the point cloud data obtained by the LiDAR device 12, corresponding to the image formation positions Obj1 and Obj2.

Thus, for the main camera 11a, a separation distance S1 in the horizontal direction between the image formation position Obj1 (i.e., the corresponding detection point of the LiDAR device 12) at which the image is originally supposed to be formed, and the image formation position Obj1" that has been influenced by the windshield 110, for example, may be determined as the image formation position shift amount. Similarly, for the sub-camera 11b, a separation distance S2 between the image formation position Obj2 (i.e., the corresponding detection point of the LiDAR device 12) at which the image is originally supposed to be formed, and the image formation position Obj2" that has been influenced by the windshield 110, for example, may be determined as the image formation position shift amount. In this case, directions denoted by reference numerals X1 and X2 in FIG. 7 may be determined as respective image formation position shift directions.

Each image formation position in this case may be specified by XY coordinates expressed by a center point of each of the image sensors 102a and 102b serving as an origin, a horizontal axis serving as a X axis, and a vertical axis serving as a Y axis. Accordingly, the image formation position shift amounts S1 and S2 and the image formation position shift directions X1 and X2 may be expressed by the XY coordinates.

Thus, the image formation position shift amounts S1 and S2 and the image formation position shift directions X1 and X2 attributed to the influence of the windshield 110, for example, may be determined.

The camera calibration unit 10a may perform the position correction by using the information on the image formation position shift amounts S1 and S2 and the information on the image formation position shift directions X1 and X2 determined in the above manner. The camera calibration unit 10a may thus make the image formation positions Obj1" and Obj2" that have been influenced by the windshield 110, for example, match the image formation positions Obj1 and Obj2 (i.e., the corresponding detection points of the LiDAR device 12) at which the images are originally supposed to be formed. Such a procedure makes it possible to perform the calibration of the stereo camera device 11.

The above description describes, as an example, the case where the image data acquired by the stereo camera device 11 is influenced by the windshield 110 to exhibit the image formation position shift. However, distortion of the optical image in the stereo camera device 11 is caused by the optical performance, for example, of the imaging lenses (101a and 101b) in some cases, as described above. The image formation position shift amount and the image formation position shift direction in such a case may also be determined from the information on the shift of the image formation positions, as with the above description.

In other words, even in a case where the influence of the windshield 110 and the influence of the imaging lens overlap to cause the image formation position shift, the image formation position shift amount and the image formation position shift direction may be determined from the image formation position shift between the original image formation position, and the image formation position in a case where the position shift is caused by optical distortion.

As illustrated in FIG. 3, the intersection points of the grid shape in the point cloud data frame GL may correspond to the plurality of points (i.e., detection points) included in the point cloud data of the LiDAR device 12. In contrast, the plurality of pixels arranged on the imaging plane of the image sensor may correspond to the plurality of points included in the point cloud data of the stereo camera device 11.

This means that the detection points (i.e., pixels) on the imaging plane of the stereo camera device 11 may be disposed more finely than the plurality of detection points within the scanning range, or the point cloud data frame GL, of the LiDAR device 12. Thus, the detection points of the LiDAR device 12 and the pixels of the stereo camera device 11 may not be in one-to-one correspondence.

In consideration of this, the image formation position shift amount at each of the pixels, or points, of an intermediate region between the corresponding points of the stereo camera device 11 corresponding to the detection points of the LiDAR device 12 may be calculated by a linear interpolation process, for example. In other words, for a region inside a substantially rectangular shape that is defined by connecting four grid points obtained by the LiDAR device 12, the image formation position shift amount corresponding to each pixel may be calculated on the basis of four sides having the four grid points as four corners.

In addition, the camera calibration unit 10a may not constantly perform the calibration process of the stereo camera device 11. For example, because the LiDAR device 12 sequentially performs scanning, the LiDAR device 12 can be unable to obtain a stable distance measuring result for an object moving at high speed.

In other words, the LiDAR device 12 may sequentially scan the predetermined recognition range while applying a laser pulse. The LiDAR device 12 can therefore be unable to acquire accurate distance information for a specific object, in an environment in which the vehicle M equipped with the traveling control apparatus 1 is in a state of moving at high speed, a large number of surrounding mobile objects are present, or the object itself is moving at high speed.

Therefore, the traveling control apparatus 1 according to the example embodiment may execute the calibration process only when the vehicle M is in a predetermined state. The predetermined state of the vehicle M in which the traveling control apparatus 1 according to the example embodiment executes the calibration process may be, for example, a state in which a load put on the traveling control apparatus 1 according to the example embodiment is light, the vehicle M equipped with the traveling control apparatus 1 is in a stable state, and a change in the surrounding environment is small.

For example, when the traveling control apparatus 1 is in an operating state and the vehicle M is in a stopped state, it may be regarded that the load put on the traveling control apparatus 1 is light and the vehicle M is in a stable state. In such a case, the predetermined calibration process may be executed in a state in which, for example, a change in the surrounding environment is small. Thus, in one example, the predetermined calibration process may be executed at a timing immediately after an engine of the parked vehicle M is started, or a timing before stopping the engine after the vehicle M that has been traveling is stopped in a predetermined parking space, for example. In addition, the traveling control apparatus 1 according to the example embodiment may be configured not to execute the predetermined calibration process at least while the vehicle M is traveling at high speed, for example.

Figure 8:
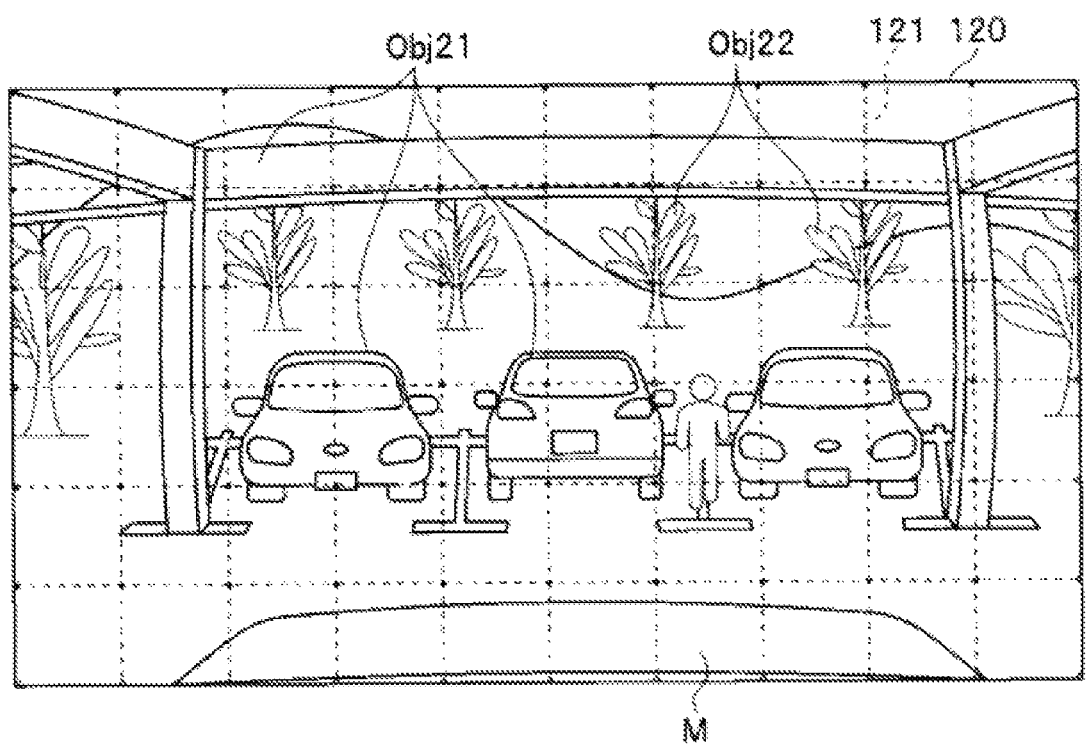
FIG. 8 is a diagram illustrating a specific but non-limiting example in a case where the corresponding point cloud data obtained by the LiDAR device is displayed to be superimposed on a captured image acquired by the stereo camera device of the traveling control apparatus illustrated in FIG. 1.

FIG. 8 illustrates an example in which the corresponding point cloud data obtained by the LiDAR device is displayed to be superimposed on an image displayed on the basis of the image data acquired by the stereo camera device 11 when the traveling control apparatus 1 is in the operating state and the vehicle M is in the stopped state, e.g., immediately after the engine of the vehicle M is started.

In FIG. 8, a reference numeral 120 denotes an imaging range frame covered by the stereo camera device 11 included in the traveling control apparatus 1 according to the example embodiment. FIG. 8 also illustrates a point cloud data detection frame 121 (indicated by a dotted line) covered by the LiDAR device 12 and having a scanning range that is substantially similar to a range of the imaging range frame 120 covered by the stereo camera device 11.

The traveling control apparatus 1 according to the example embodiment may perform the calibration process of the stereo camera device 11 in a state in which, for example, various objects are present at a position separated by a predetermined distance in the front region of the vehicle M, when the traveling control apparatus 1 is in the operating state and the vehicle M equipped with the traveling control apparatus 1 is in a stable stopped state. In this case, the front object may be, for example, a structure for which the stereo camera device 11 is able to reliably acquire parallax information. In addition, the front object may include, for example, both a stationary short-distance object present at a position relatively close to the vehicle M (see a reference numeral Obj21), and a stationary long-distance object Obj22 present at a distant position.

Under such a surrounding environment, the calibration process of the stereo camera device 11 may be performed in a situation in which, for example, the LiDAR device 12 is able to stably and reliably acquire the point cloud data of the plurality of detection points, it is possible to perform the stereo matching process of the image acquired by the stereo camera device 11 for the points corresponding to the detection points of the LiDAR device 12, and it is possible to acquire the distance information of the same corresponding points.

Under such a situation, the traveling control apparatus 1 according to the example embodiment may execute the calibration process of the stereo camera device 11, with respect to the point cloud data of the LiDAR device 12.

As the point cloud data acquired by the LiDAR device 12, it is difficult to constantly detect all the detection points within the scanning range of the LiDAR device 12, even under a predetermined condition (e.g., see the situation of FIG. 8).

For example, for an object with low reflectance, it is difficult for the LiDAR device 12 to receive reflected light (i.e., a return pulse) of the applied laser pulse in some cases. Accordingly, it is difficult to obtain a detection result in some cases in a region, within the predetermined scanning range, in which an object meeting such a predetermined condition (e.g., a condition such as low reflectance) is present. Also for a region such as the sky, the LiDAR device 12 is not able to obtain a detection result because it is difficult to receive reflected light.

This means that, in a case where the LiDAR device 12 sequentially performs scanning within the predetermined scanning range, undetectable points occur in some cases in a partial region within the predetermined scanning range.

Hence, the traveling control apparatus 1 according to the example embodiment may store, each time the calibration process is performed, position shift data regarding the position shift amount and shift direction between the detection point obtained by the LiDAR device 12 and the corresponding point obtained by the stereo camera device 11, and generate a correction map of the whole predetermined scanning range.

This correction map may be stored in the unillustrated predetermined storage memory, for example, of the vehicle M, as information unique to the specific vehicle M equipped with the traveling control apparatus 1. The stereo camera device 11 may acquire subsequent point cloud data with reference to the generated correction map.

The correction map generated in the above manner may be updated at any time by the calibration process performed as appropriate. The traveling control apparatus 1 according to the example embodiment may have the outline configuration described above.

Figure 9:
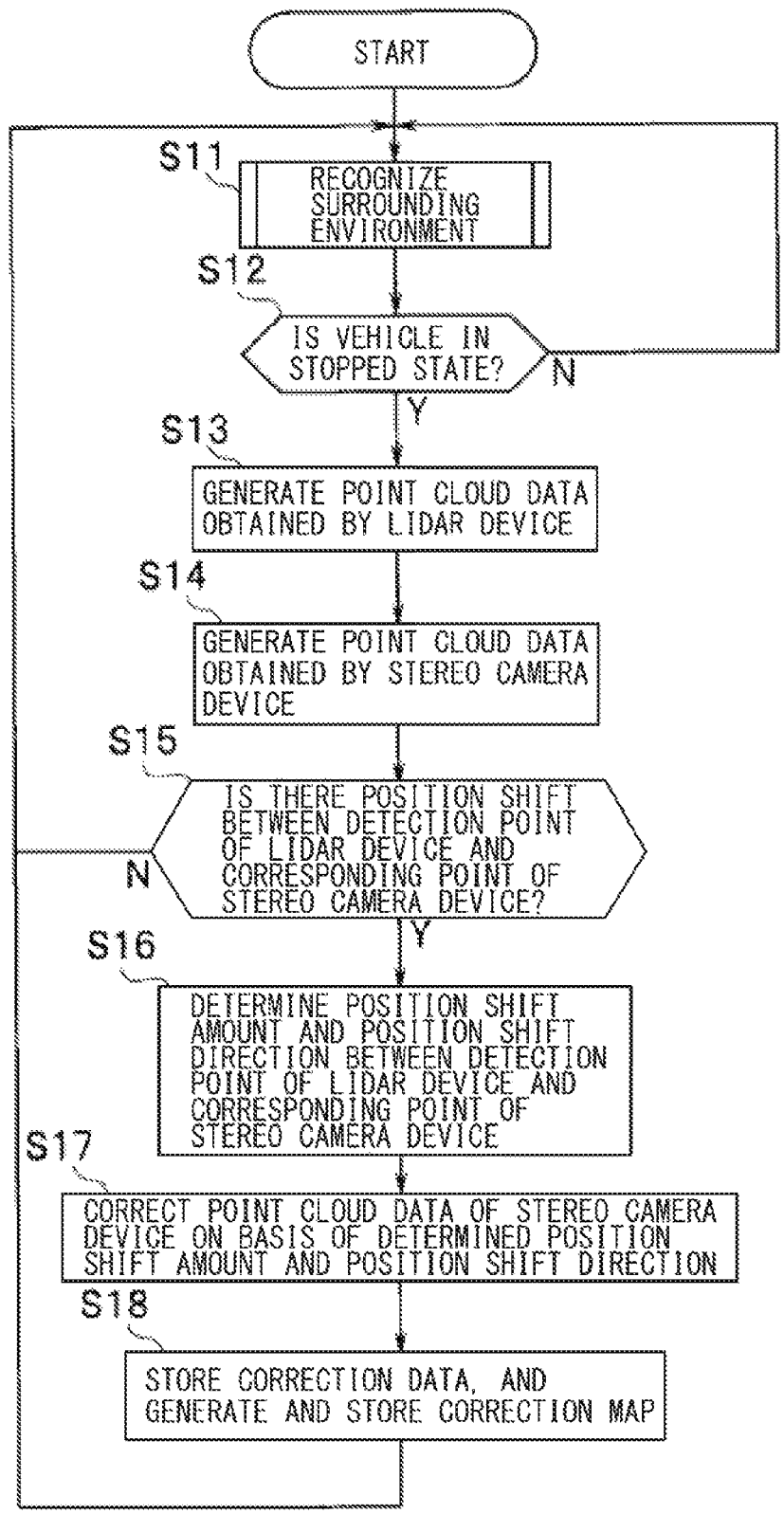
FIG. 9 is a flowchart illustrating workings when performing calibration of the stereo camera device on the basis of the data acquired by the LiDAR device, out of workings of the traveling control apparatus according to one example embodiment of the technology.

Described below are workings when the traveling control apparatus 1 according to the example embodiment having such a configuration performs the calibration process of the stereo camera device, with respect to the point cloud data acquired by the LiDAR device. FIG. 9 is a flowchart illustrating workings related to any embodiment of the technology, i.e., the calibration process of the stereo camera device, out of workings of the traveling control apparatus according to the example embodiment of the technology.

A process sequence illustrated in FIG. 9 may be processes that constantly keep being executed, concurrently with various control processes of the traveling control apparatus 1 according to the example embodiment. In other words, the process sequence in FIG. 9 may start to be executed at the same time as the traveling control apparatus 1 is brought into operation, and may be continuously executed while the traveling control apparatus 1 is in operation. The process sequence may also stop at the same time as the operation of the traveling control apparatus 1 is stopped.

First, the vehicle M equipped with the traveling control apparatus 1 according to the example embodiment may be activated, and units including the stereo camera device 11, the LiDAR device 12, and the control unit 10 start operation. The vehicle M may thus enter a state of being able to travel. Thus, the flowchart of FIG. 9 may be started.

In step S11 of FIG. 9, the control unit 10 may first drive and control the various sensors, including the stereo camera device 11 and the LiDAR device 12, and execute a surrounding environment recognition process of recognizing the surrounding environment including the front region of the own vehicle via these various sensors.

The stereo camera device 11 and the LiDAR device 12 may each recognize the surrounding environment, such as various three-dimensional objects included in the predetermined range in mainly the front region of the vehicle M. The control unit 10 may also detect a state of the own vehicle itself (e.g., a vehicle speed or a set traveling control type or mode). This surrounding environment recognition process may keep being performed constantly while the traveling control apparatus 1 is in operation.

Next, in step S12, the control unit 10 may confirm whether the vehicle M is in the stopped state. If it is confirmed that the vehicle M is in the stopped state ("Y" in step S12), the flow may proceed to the process of step S13. If it is confirmed that the vehicle M is not in the stopped state ("N" in step S12), for example, if the vehicle M is in a traveling state, the flow may return to the process of step S11, and the subsequent process sequence may be repeated.

In step S13, the control unit 10 may generate the point cloud data obtained by the LiDAR device 12.

Subsequently, in step S14, the control unit 10 may generate the point cloud data obtained by the stereo camera device 11.

The following is an outline of a process of acquiring the point cloud data obtained by the stereo camera device 11. First, the two cameras (i.e., the main camera 11$a$ and the sub-camera 11$b$) of the stereo camera device 11 may acquire a pair of left and right image data. Thereafter, the stereo camera device 11 may perform a predetermined stereo matching process on the basis of the pair of image data, to determine parallax information of detection points for the same object. On the basis of the parallax information, the stereo camera device 11 may generate the point cloud data extending over the whole image range.

Next, in step S15, the control unit 10 may compare the point cloud data acquired by the LiDAR device 12 and the point cloud data acquired by the stereo camera device 11, and confirm, for each detection point, whether there is a position shift for positions corresponding to each other of the same object. The positions may be, for example, the position corresponding to the detection point of the LiDAR device 12, and the position of the corresponding point, on the image of the stereo camera device 11, corresponding to the detection point. If a position shift is confirmed ("Y" in step S15), the flow may proceed to the next process of step S16. If a position shift is not confirmed ("N" in step S15), the flow may return to the above process of step S11, and subsequent processes may be repeated.

In step S16, the control unit 10 may determine the position shift amount and the position shift direction between the position corresponding to the detection point of the LiDAR device 12, and the corresponding point, on the image of the stereo camera device 11, corresponding to the detection point. The control unit 10 may thus generate position correction data.

Next, in step S17, the control unit 10 may correct the point cloud data of the stereo camera device 11, on the basis of the position correction data including the position shift amount and the position shift direction determined in the above process of step S16.

In step S18, the control unit 10 may store the position correction data determined in the above process of step S16 in the unillustrated predetermined storage memory or an unillustrated internal memory of the control unit 10, for example, and generate a correction map unique to the stereo camera device 11. The generated correction map may be stored in the unillustrated predetermined storage memory, for example. The stereo camera device 11 may correct the acquired image data, with reference to the correction map. The stereo camera device 11 may use the corrected image data thus obtained to perform a process of calculating the distance information, for example. Note that the correction map stored in the storage memory may be updated as appropriate as a result of the calibration process executed at a predetermined timing each time the vehicle M equipped with the traveling control apparatus 1 is used.

As described above, according to one example embodiment described above, the vehicle traveling control apparatus includes the surrounding environment recognition device with a duplexed system. The surrounding environment recognition device includes the stereo camera device 11 (i.e., the passive sensor device) and the LiDAR device 12 (i.e., the active sensor device) in combination and performs environment recognition of the front region in the traveling direction. The vehicle traveling control apparatus includes the camera calibration unit 10a that easily and reliably performs calibration of the stereo camera device 11, by correcting the position shift of the three-dimensional image information acquired by the stereo camera device 11 with respect to the three-dimensional point cloud data acquired by the LiDAR device 12.

In this case, the camera calibration unit 10a may perform a position shift correction process of correcting the position shift of the three-dimensional image information of the stereo camera device 11 for each pixel, making it possible to perform finer calibration.

The correction data for each pixel generated when the camera calibration unit 10a performs the position shift correction process may be stored sequentially in the unillustrated storage memory or the storage memory inside the control unit. The camera calibration unit 10a may generate a correction map corresponding to the recognition range of the stereo camera device 11, on the basis of the correction data stored in the storage memory. This configuration makes it possible to perform more reliable calibration over the whole recognition range of the stereo camera device 11. Furthermore, the camera calibration unit 10a may execute the position shift correction process at a suitable timing as appropriate, and store the acquired correction data each time. This contributes to a reduction in processing, making it possible to reduce a load on the processing circuit included in the traveling control apparatus 1.

The correction process by the camera calibration unit 10a may be executed when the vehicle M equipped with the traveling control apparatus 1 is in the stable stopped state. This makes it possible to acquire reliable correction data.

Thus, calibration for the stereo camera device 11 is performed with respect to the data acquired by the LiDAR device 12, which enables the stereo camera device 11 to constantly acquire the three-dimensional image information including more accurate distance information. Consequently, the traveling control apparatus 1 according to the example embodiment makes it possible to ensure higher safety and reliability.

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein. For example, in a case where the above-described concerns may be addressed and the above-described effects may be obtained even if some features are deleted from all the features disclosed herein, the remaining features may be extracted as a technology. Elements in different example embodiments may be combined as appropriate. The technology is limited only by the appended claims or the equivalents thereof, and is not limited by specific example embodiments thereof.

According to at least one embodiment of the technology, it is possible to provide the vehicle traveling control apparatus including the surrounding environment recognition device. The vehicle traveling control apparatus makes it possible to reliably perform, with a simple configuration, calibration of the stereo camera device that performs environment recognition of the front region in the traveling direction, to constantly acquire the three-dimensional image information including accurate distance information, and to ensure higher safety and reliability.

The control unit 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control unit 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control unit 10 illustrated in FIG. 1.

The invention claimed is:

1. A vehicle traveling control apparatus to be applied to a vehicle, the vehicle traveling control apparatus comprising:
 a stereo camera device configured to recognize a predetermined range of a front region of the vehicle as an image to acquire image data, and to acquire three-dimensional image information including distance information on a basis of the acquired image data;
 a light detection and ranging device configured to acquire three-dimensional point cloud data including distance information for each of detection points, by scanning substantially a same range as a range recognized by the stereo camera device, of the front region of the vehicle;

a camera calibration unit configured to perform calibration of the stereo camera device, by performing a position shift correction process of correcting, for each of pixels, a position shift of the three-dimensional image information acquired by the stereo camera device, with respect to the three-dimensional point cloud data acquired by the light detection and ranging device; and a storage memory configured to sequentially store correction data for each of the pixels, the correction data being generated when the camera calibration unit performs the position shift correction process, wherein the camera calibration unit is configured to generate, on a basis of the correction data stored in the storage memory, a correction map corresponding to the range recognized by the stereo camera device.

2. The vehicle traveling control apparatus according to claim 1, wherein the correction by the camera calibration unit is executed when the vehicle is in a stable stopped state.

3. A vehicle traveling control apparatus for a vehicle, the vehicle traveling control apparatus comprising:

a stereo camera device configured to capture images of a first area in front of the vehicle, match corresponding features in the images, calculating parallax for each matched feature, computing depth using the parallax, and combine the matched features to generate point cloud data for the first area, wherein the point cloud data is a collection of data points defined in a three-dimensional coordinate system;

a light detection and ranging device configured to scan, using laser pulses, a second area that is substantially same as the first area of which the images are captured by the stereo camera device, measure distances to the features, calculate three-dimensional coordinates based on the distances, and generate point cloud data that is a collection of data points defined in the three-dimensional coordinate system; and a processor programmed to:

determine displacement between each data point obtained using the stereo camera device and respective one data point obtained using the light detection and ranging device, and a direction of the displacement;

generate correction data for the stereo camera device based on the determined displacement between each data point obtained using the stereo camera device and respective one data point obtained using the light detection and ranging device; and correct the point cloud data obtained using the stereo camera device based on the correction data.

4. The vehicle traveling control apparatus according to claim 3, wherein the correction data includes information for respective pixels of the images captured by the stereo camera device, and wherein the processor is further configured to correct, on a per-pixel basis, the point could data obtained using the stereo camera device.

5. The vehicle traveling control apparatus according to claim 4, further comprising a memory configured to store the correction data, and store subsequently-generated correction data, wherein the processor is further configured to correct the point cloud data obtained using the stereo camera device based on the correction data stored in the memory.

6. The vehicle traveling control apparatus according to claim 4, wherein the processor is configured to correct the point cloud data obtained using the stereo camera device when the vehicle is in a stopped state.

7. The vehicle traveling control apparatus according to claim 3, wherein the processor is configured to correct the point cloud data obtained using the stereo camera device when the vehicle is in a stopped state.

* * * * *